United States Patent [19]
Nakazumi et al.

[11] Patent Number: 4,985,668
[45] Date of Patent: Jan. 15, 1991

[54] ROBOT CONTROLLER

[75] Inventors: Akira Nakazumi, Tokorozawa; Nobuaki Imamura, Kobe, both of Japan

[73] Assignee: Kabushiki Kaisha Kobe Seiko Sho, Kobe, Japan

[21] Appl. No.: 409,316

[22] Filed: Sep. 19, 1989

[51] Int. Cl.$^5$ .............................................. G05B 19/42
[52] U.S. Cl. .................... 318/568.2; 318/567; 318/568.16; 364/513
[58] Field of Search ................................ 318/560-634; 364/513; 901/20-24

[56] References Cited

U.S. PATENT DOCUMENTS

| | | | |
|---|---|---|---|
| 3,882,368 | 5/1975 | Carleton | 318/610 |
| 4,345,194 | 8/1982 | Green | 318/621 |
| 4,518,909 | 3/1985 | Friedli et al. | 318/566 |
| 4,535,277 | 8/1985 | Kurakake | 318/561 |
| 4,540,925 | 9/1985 | Jones | 318/602 |
| 4,542,471 | 9/1985 | Inaba et al. | 364/513 |
| 4,603,284 | 7/1986 | Perzley | 318/568.16 X |
| 4,621,332 | 11/1986 | Sugimoto et al. | 364/513 |
| 4,629,956 | 12/1986 | Nozawa et al. | 318/625 |
| 4,707,780 | 11/1987 | Gose et al. | 318/632 X |
| 4,740,885 | 4/1988 | Gose et al. | 364/513 |
| 4,816,734 | 3/1989 | Kurakake et al. | 318/618 X |
| 4,851,748 | 7/1989 | Daggett et al. | 318/568.2 |
| 4,859,920 | 8/1989 | Kurakake et al. | 318/567 |

Primary Examiner—Paul Ip
Attorney, Agent, or Firm—Oblon, Spivak, McClelland, Maier & Neustadt

[57] ABSTRACT

A robot controller for an articulated robot, capable of controlling the articulated robot for the highly accurate high-speed movement of the work along a predetermined route. The robot controller a memory for previously storing functions for calculating position gains and speed gains for the joints of the articulated robot. A detecting operates to detect the present position and present speed of each of the joints during the operation of the articulated robot. A first calculating operation calculates a position gain and a speed gain for each joint on the basis of the present position and present speed of the joint detected by the detecting feature by using the functions stored in the memory. A second calculating operation the calculates instructions to be give to the actuators on the basis of position instructions, the present position and the present speed of the joints detected by the detecting feature, and the position gains and the speed gains calculated by the first calculating operation.

1 Claim, 5 Drawing Sheets

ROBOT CONTROLLER

BACKGROUND OF THE INVENTION

1. Field of the Invention

The present invention relates to a robot controller for controlling an articulated robot, such as a welding robot and, more particularly, to a robot controller for controlling an articulated robot, capable of controlling the movement of a work gripped by the gripping unit of the articulated robot along a desired locus at a high accuracy.

2. Description of the Prior Art

In an industrial robot having a plurality of degrees of freedom of motion, such as an articulated robot or a polar coordinates robot, the load on each joint shaft varies owing to the variation of the moment of inertia of components according to the mode of action of a plurality of actuators. Since the variation of the moment of inertia of the component affects the response characteristics of a servomechanism associated with each joint shaft, the moment of inertia of the component must be taken into consideration in controlling the industrial robot.

J.P. Pat. Provisional Pub. (Kokai) No. 61-163406 proposes a control system which calculates the variation of the moment of inertia on the basis of the performance of the actuator. FIGS. 4, 5, 6 and 7 illustrate this previously proposed control system.

Referring to FIG. 5, an articulated robot RB has six degrees of freedom of motion, and the component segments of the articulated robot RB are rotatable as indicated by $\theta_1$ to $\theta_6$ respectively on joints 1 to 6. These component segments are driven for rotation respectively on the joints 1 to 6 by servomotors $M_1$ to $M_6$, not shown in FIG. 5.

Referring to FIG. 6 diagrammatically showing a robot controller for controlling the articulated robot RB of FIG. 5, a CPU (central processing unit) 9 executes operations for providing instructions, analyzing data, calculating instructions and calculating data for position control servomechanisms in accordance with data given thereto by operating a keyboard 8, and gives outputs to servo amplifiers $A_1$ to $A_6$. The servo amplifiers $A_1$ to $A_6$ give control signals produced by amplifying the outputs of the CPU 9 to the servomotors $M_1$ to $M_6$. Photoencoders $E_1$ to $E_6$ are combined respectively with the servomotors $M_1$ to $M_6$ detect the angles of rotation of the servomotors $M_1$ to $M_6$, and then give detection signals representing the angles of rotation to the CPU 9.

Referring to FIG. 7 showing one of the six position control servomechanisms for the joints 1 to 6, a position control servo loop 60 includes a speed control minor servo loop 61. A deviation signal 63 is obtained by subtracting feedback position data 77 fed back through the position control loop 60 from angle instruction data 62 created on the basis of data stored in a memory, not shown, by teaching operations and instructions given by operating the keyboard 8. A block 64 amplifies the deviation signal 63 at a gain of $K_p$ to provide an output position signal 65. Feedback speed data 79 fed back through the speed control minor servo loop 61 is subtracted from the output position signal 65 to obtain a deviation signal 66. The servo amplifier 67 (one of the servo amplifiers $A_1$ to $A_6$) amplifies the deviation signal 66 at a gain of $K_a$ to give an amplified output signal 68 to the motor M (one of the servomotors $M_1$ to $M_6$). The motor M generates a torque 70 corresponding to a torque constant $K_t$ specified by a block 69. A block 71 integrates the torque 70 with respect to time and divides the integral by the moment of inertia to obtain a rotating speed 72. In FIG. 7, indicated at s is a Laplace operator and at J is a moment of inertia obtained by converting a moment of inertia with respect to the axis of the joint into a moment of inertia with respect to the axis of the shaft of the motor M. A block 73 integrates the rotating speed 72 with respect to time to obtain an angle of rotation 74 of the motor M.

The photoencoder E (one of the photoencoders $E_1$ to $E_6$) encodes the rotating speed 72 of the motor M at an encoder gain of $K_e$ to provide an encoder output 75. Although it was presumed in the description with reference to FIG. 6 that the photoencoders $E_1$ to $E_6$ are those for detecting the angle of rotation, it is presumed in the description with reference to FIG. 7 for convenience' sake that the photoencoders $E_1$ to $E_6$ are those for detecting the rotating speed 72.

A block 76 integrates the encoder output 75 with respect to time to obtain a feedback position data 77, which is fed back to a point before the block 64. A block 78 operates the feedback position data 77 by using a speed gain $K_v$ to provide a feedback speed data 79. In the foregoing processes, viscous resistances are neglected for simplicity.

The moment of inertia J is dependent on joint angles at the joints 2 to 6 and the mass of the work, not shown, held by the articulated robot RB. The influence of the variation of the joint angles at the joints 4, 5 and 6 on the variation of the moment of inertia J is comparatively small as compared with that of other factors. Therefore, in this example, the value of the speed gain $K_v$ is varied according to the joint angles at the joints 2 and 3 and the mass of the work. The range of each of the joint angles $\theta_2$ and $\theta_3$ is divided into a plurality of subranges, for example, sixteen subranges, an optimum speed gain $K_{v0}$ when the mass of the work is zero, an optimum speed gain $Kv_{max}$ when the mass of the work corresponds to the maximum allowable weight capacity and the difference $\Delta K_v$ between the speed gain $Kv_{max}$ and the speed gain $K_{v0}$ are calculated beforehand for each subrange, and the calculated values are stored in a memory, such as a RAM.

Speed gain $K_v$ to be used by the servo loop during the operation of the articulated robot RB is calculated by:

$$K_v = K_{v0} + \Delta K_v \times m/M_{max} \quad (1)$$

where m (kg) is the mass of the work, $M_{max}$ is the maximum allowable mass capacity, $K_{v0}$ is optimum speed gain when m=0, and $\Delta K_v$ is the difference between the maximum speed gain when m=$M_{max}$ and $K_{v0}$.

FIG. 4 shows steps of procedure for calculating the values of the speed gain $K_v$ for all the joints and for controlling the articulated robot RB by using the values of speed gain $K_v$.

Referring to FIG. 4, the mass of the work is measured in step 51. In step 52, the values of speed gain $K_{v0}$ and the difference $\Delta K_v$ for the joints 3, 4, 5 and 6 are read from the memory, the values of speed gain $K_v$ for the joints 3, 4, 5 and 6 are calculated by using the expression (1), and then the calculated values of speed gain $K_v$ are written in the gain table of the memory.

In step 53, the present subrange of the joint angle $\theta_3$ is detected. This subrange may be detected by reading a desired angle of movement from the memory or by detecting the present joint angle by the photoencoder $E_3$. In either manner, the present joint angle is determined during the operation of the articulated robot RB.

In step 54, the values of speed gain $K_{v0}$ and difference $\Delta K_v$ for the joint 2 corresponding to the detected subrange of the joint angle $\theta_3$ are read from the table of the memory, the value of speed gain $K_v$ for the joint 2 is calculated by using the expression (1), and then the calculated value is written in the gain table.

Similarly, in step 55, the subrange of the joint angle $\theta_2$ is detected, the values of speed gain $K_{v0}$ and difference $\Delta K_v$ for the joint 1 corresponding to the subranges of the joint angles $\theta_2$ and $\theta_3$ are read from the table of the memory, the value of speed gain $K_v$ for the joint 1 is calculated by using the expression (1), and then the calculated value of speed gain $K_v$ for the joint 1 is written in the gain table.

Thus, the values of speed gain $K_v$ for all the joints at a specified time are specified. Then, in step 57, the values of speed gain $K_v$ are given together with input data including instructions for robot motions, constants and feedback data to the CPU, the CPU calculates output instructions for the servomechanisms and the calculated output instructions are given to the driving mechanisms. In step 58, a determination is made to see if the instructions are final. These steps are repeated until final instructions are obtained.

The foregoing operation of the conventional robot controller is summarized as follows.

Sets of the amounts of actions (joint angles) of the actuators, namely, the servomotors $M_1$ to $M_6$, reference values ($K_{v0}$) of speed gain for the position servomechanism and the variation ($\Delta K_v$) of speed gain corresponding to the variation of the mass of the work are stored in the memory, the reference values of speed gain and the variations of speed gain corresponding to the amounts of actions of the actuators detected by the photoencoders $E_1$ to $E_6$ are read from the memory upon the detection of the amounts of actions of the actuators, values of speed gain ($K_v$) corresponding to the moments of inertia (J) of the actuators are calculated on the basis of the data read from the memory, and then outputs for the servomechanisms are calculated on the basis of the calculated values of speed gain to control the servomechanisms for optimum response to the variation of the moments of inertia resulting from changes in the position of the functional components of the articulated robot and in the mass of the work.

However, it is difficult to control the locus of the work at a high accuracy by only controlling speed gain according to the variation of the moment of inertia resulting from variation in the position of the functional components of the articulated robot, because position gain is a significant factor affecting the response of the servomechanisms of the articulated robot.

Furthermore, the stepwise change (discontinuous change) of speed gain by reading the values of speed gain from the tables of the memory causes sudden changes in the values of instructions when the values of speed gain are read from positions near the boundaries of the tables, which adversely affects to the motion of the articulated robot deteriorating the accuracy of the locus of the work.

SUMMARY OF THE INVENTION

Accordingly, it is an object of the present invention to provide a robot controller eliminating the foregoing disadvantages of the conventional robot controller and capable of controlling an articulated robot for the highly accurate high-speed movement of the work without requiring a memory having a large capacity.

In one aspect of the present invention, a robot controller for controlling an articulated robot having a position control system for controlling the actuators of the articulated robot on the basis of position instructions and a speed control system comprises memory means for previously storing functions for calculating position gains and speed gains for joints of the articulated robot, detecting means for detecting the present position and present speed of each of the joints during the operation of the articulated robot; first calculating means for calculating a position gain and a speed gain for each joint shaft on the basis of the present position and present speed of the joint detected by the detecting means by using the functions stored in the memory means; and second calculating means for calculating instructions to be given to the actuators on the basis of the position instructions, the present positions and the present speeds detected by the detecting means, and the position gains and the speed gains calculated by the first calculating means.

The robot controller of the present invention uses the position gain in addition to the speed gain as a variable for the feedback position control by using a control loop including a speed control loop as a minor loop, and determines the speed gain and the position gain taking into account the moments of inertia of all the joints by representing the position gain and the speed gain as functions of the positions of the actuators. The gains are stored as functional coefficients in a memory means having a comparatively small capacity instead of storing the gains in tables. A first calculating operation calculates the position gain and the speed gain on the basis of the present position and the present speed detected by the a detecting operation during the operation of the articulated robot by using the functional coefficients. A second calculating operation calculates instruction outputs for the position control system and the speed control system on the basis of the data detected by the detecting operation and position instructions and gives the instruction outputs to the actuators for the accurate position control of the articulated robot.

Thus, the robot controller of the present invention has the following advantages.

(1) Continuous change of the position gain and speed gain of the control systems according to the position and speed of the articulated robot enables uniform control of the work over the entire range of motion of the articulated robot.

(2) The regulation of the position gain in addition to the speed gain enables the highly accurate control of the locus of the work in response to the variation of the position and operating speed of the joints.

(3) The storage of the gains as a function requires a memory having a comparatively small storage capacity, the highly accurate control of the movement of the work, which reduces the cost of the articulated robot and improves the performance of the articulated robot.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENT

Figure 5:
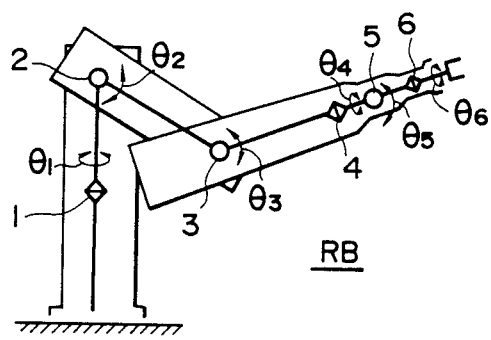
FIG. 5 is a diagram of a conventional articulated robot.

A robot controller embodying the present invention will be described hereinafter as applied to an articulated robot having six degrees of freedom of motion as shown in FIG. 5.

Figure 1:
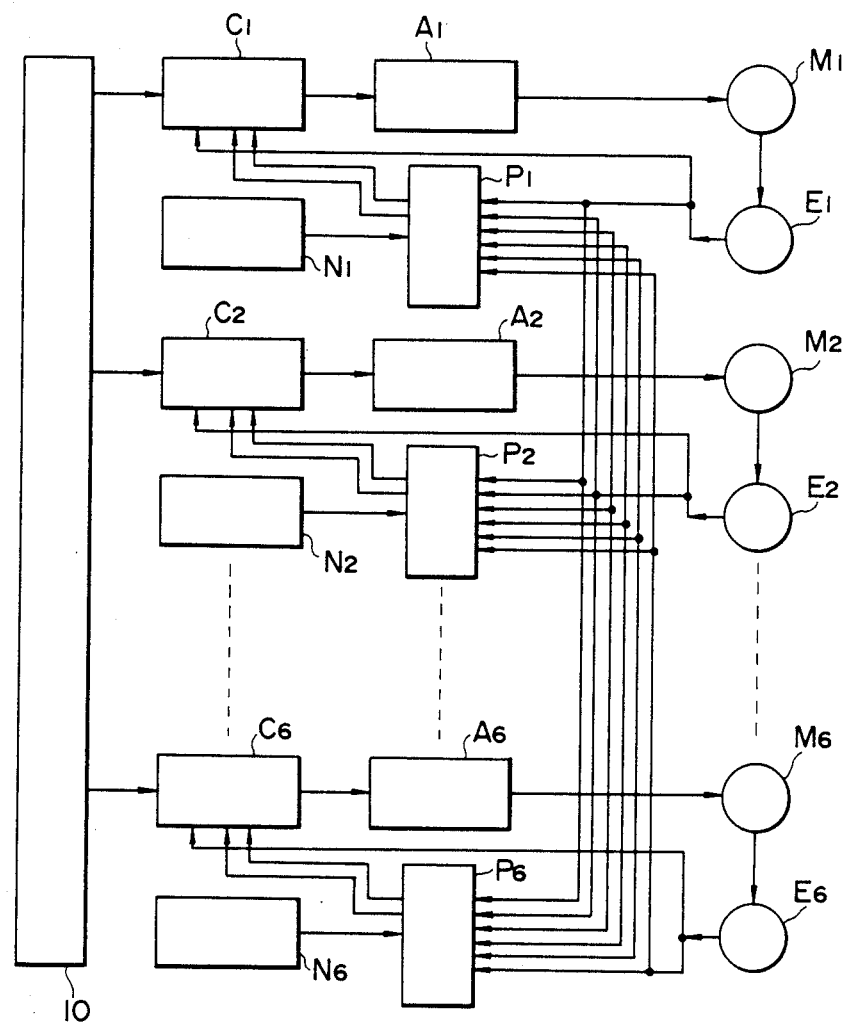
FIG. 1 is a block diagram of a robot controller in a preferred embodiment according to the present invention.

Shown in FIG. 1 are a coordinates converting unit 10 for converting position data on a rectilinear coordinate system into position instructions for joint shafts, position and speed control units $C_1$ to $C_6$ (second calculating means) which receive position instructions $\theta_1$ to $\theta_6$, respectively, from the coordinates converting unit 10 and execute position and speed control operation, servo amplifiers $A_1$ to $A_6$, servomotors $M_1$ to $M_6$ (actuators) associated, respectively, with the joint shafts, position detectors (photoencoders) $E_1$ to $E_6$, memories $N_1$ to $N_6$ for storing functional coefficients, and gain calculating units $P_1$ to $P_6$ (first calculating means) for calculating speed gains $G_v$ and position gains $G_p$ on the basis of the position data representing the positions of the joints and coefficients stored in the memories $N_1$ to $N_6$.

Figure 2:
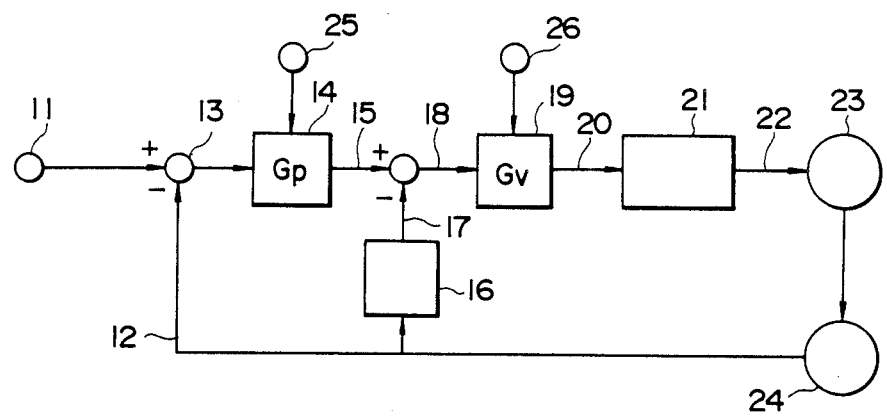
FIG. 2 is a block diagram of a servomechanism included in the robot controller of FIG. 1.

Each of the position and speed control units $C_1$ to $C_6$ are the same in constitution and function. Referring to FIG. 2 showing one of the position and speed control units $C_1$ to $C_6$, upon the reception of the position instruction 11 (one of the position instructions $\theta_1$ to $\theta_6$), the position and speed control unit subtracts a position signal 12 representing the present position of the associated joint provided by the position detector 24 (one of the position detectors $E_1$ to $E_6$) associated with the servomotor 23 (one of the servomotors $M_1$ to $M_6$) from the position instruction 11 to obtain a position deviation 13. Then, a position gain multiplier 14 multiplies the position deviation 13 by a position gain $G_p$ to obtain a signal 15.

A differentiator calculates the variation of the position signal 12 with time to determine the present speed 17. The present speed 17 is subtracted from the signal 15 to obtain a composite position and speed feedback signal 18. A speed gain multiplier 19 multiplies the composite position and speed feedback signal 18 by a speed gain $G_v$ to provide a signal 20. The signal 20 is given to the servo amplifier 21 to control the servomotor 23.

The set value of the position gain $G_p$ can be changed by a signal 25 given from the gain calculating unit (one of the gain calculating units $P_1$ to $P_6$) to the position gain multiplier 14. Similarly, the set value of the speed gain $G_v$ can be changed by a signal 26 given from the gain calculating unit to the speed gain multiplier 19.

Figure 3:
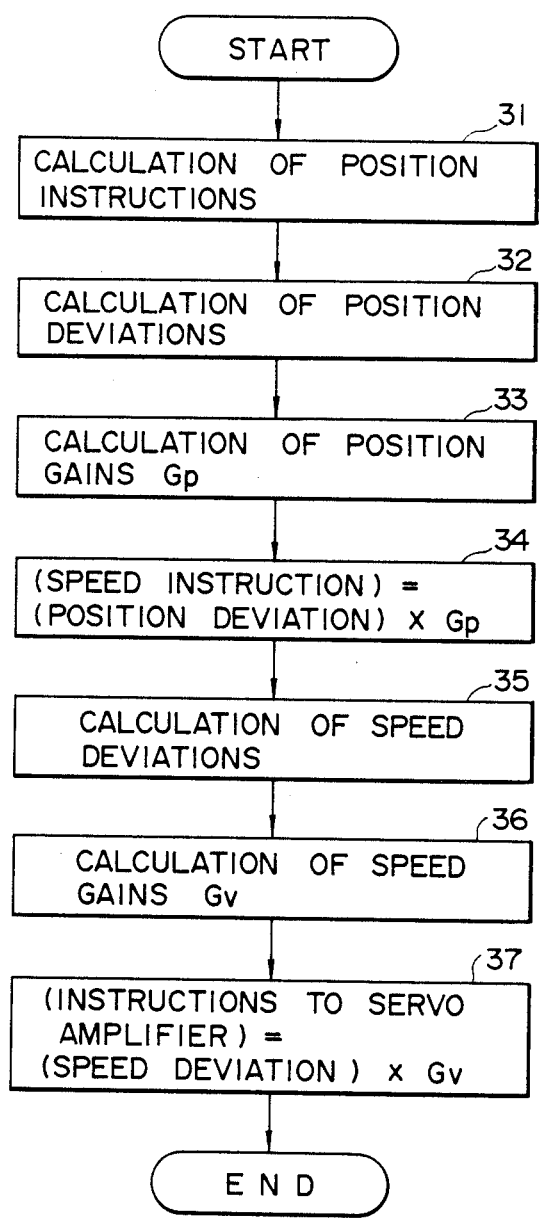
FIG. 3 is a flow chart of control procedure to be carried out by the robot controller of FIG. 1.
Figure 4:
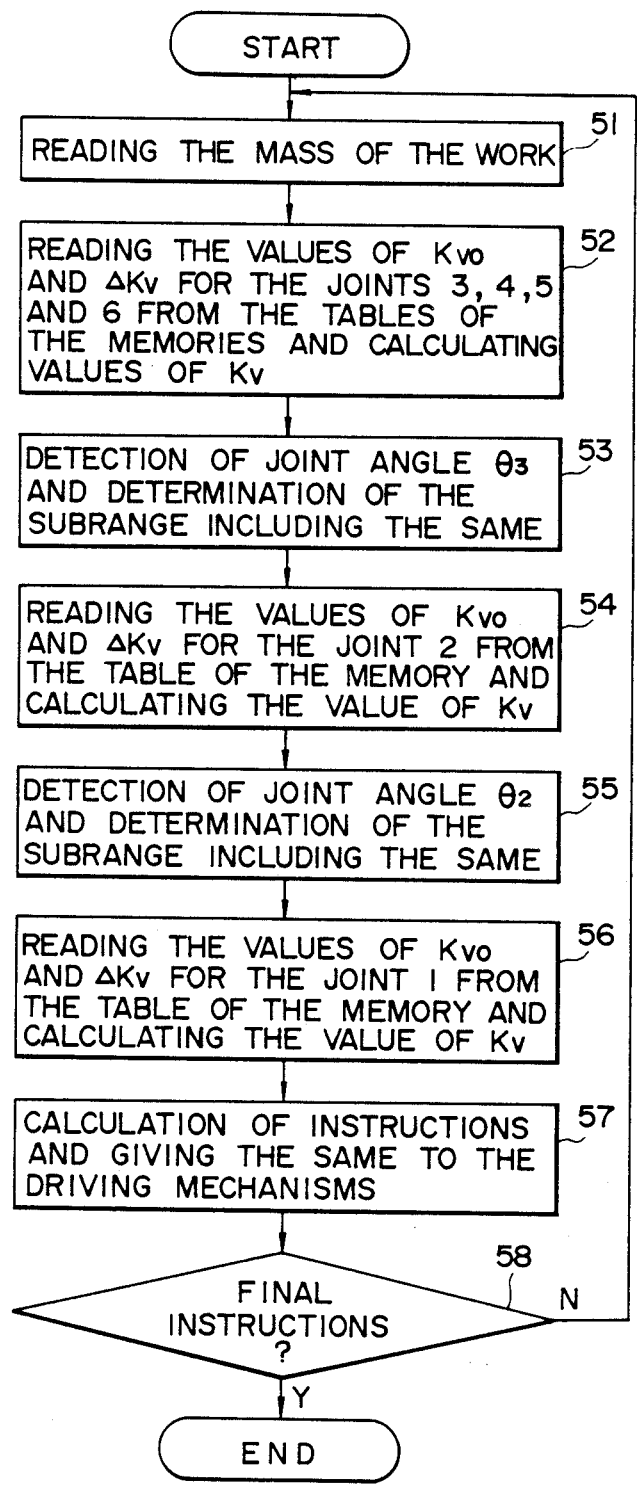
FIG. 4 is a flow chart of control procedure to be carried out by a conventional robot controller.
Figure 6:
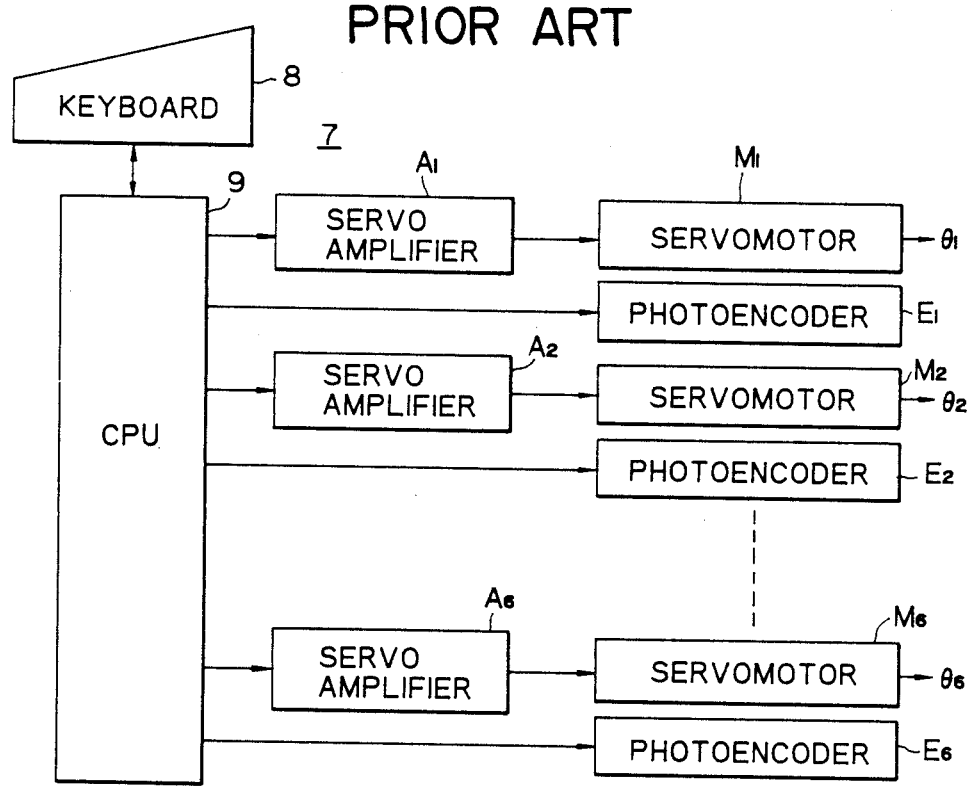
FIG. 6 is a block diagram of assistance in explaining the constitution of a conventional robot.
Figure 7:
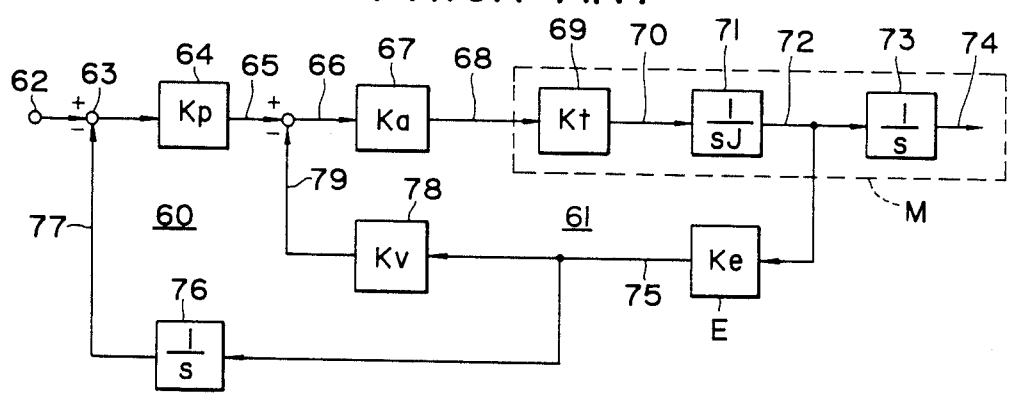
FIG. 7 is a block diagram of a servomechanism included in the conventional robot controller.

Referring to FIG. 3 showing a control program to be executed by a control circuit comprising the position and speed control unit $C_i$ (i is one of numerals 1 to 6), the memory $N_i$ and the gain calculating unit $P_i$, the control circuit receives data representing the present position of the joint and a position instruction for the joint in step 31 and calculates a position deviation, namely, the difference between the position instruction and the present position, in step 32. In step 33 a position gain $G_{pi}$ is calculated by using:

$$G_{pi} = f_i(\theta_i) \qquad (2)$$

where $f_i$ is a simple function, such as a quadratic function, and $\theta_i$ is a position instruction for the joint i.

The function $f_i$ of the expression (2) is stored in the memory $N_i$, and the position gain $G_{pi}$ corresponding to the position instruction $\theta_i$ is calculated by substituting the position instruction $\theta_i$ for the joint received in step 31 into the expression (2).

In step 34, the position deviation is multiplied by the position gain $G_{pi}$ to obtain a speed instruction $V_i$. In step 35, the present speed is subtracted from the speed instruction $V_i$ to obtain a speed deviation. In step 36, a speed gain $G_v$ is calculated by using:

$$G_{vi} = h_i(V_i) \qquad (3)$$

where $h_i$ is a simple function, such as a linear function, $V_i$ is the speed instruction for the joint i.

In step 37, the speed deviation is multiplied by the speed gain $G_{vi}$ to provide an instruction for the servo amplifier $A_i$.

Thus, these simple functions for calculating the position gain $G_{pi}$ and the speed gain $G_{vi}$ are stored in the memory $N_i$ and the position gain $G_{pi}$ and the speed gain $G_{vi}$ are changed continuously according to the position and speed of the joint to improve the response characteristics of the servomechanism for the entire region of movement of the joint.

The calculations in steps 31 to 37 of the control program can be achieved by a single or a plurality of CPUs. Sampling periods for sampling data are decreased in the order of the coordinates conversion, the position control and the speed control.

Thus, the robot controller varies the position gain $G_{pi}$ and the speed gain $G_{vi}$ among the control constants for each joint as functions of the condition of all the joints for the continuous, highly accurate position and speed control of the joints. Since the position gains $G_p$ and the speed gains $G_v$ are calculated by using simple expressions for every control cycle, no table for storing the position gains $G_p$ and the speed gains $G_v$ is necessary and hence the robot controller may be provided with a comparatively small number of memories having a comparatively small storage capacity.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A robot controller for controlling an articulated robot, comprising a position control system with a speed control minor servo loop for controlling the actuators of the articulated robot on the basis of position instructions, the improvement comprising:

memory means for previously storing functions for calculating position gains and speed gains for each joint of the articulated robot;

detecting means for detecting the present position and present speed of each of the joints during the operation of the articulated robot;

first calculating means for calculating a position gain and a speed gain for each joint on the basis of the present position and present speed of the joint detected by the detecting means by using the functions stored in the memory means; and second calculating means for calculating instructions to be given to the actuators on the basis of position instructions, the present positions and present speeds of the joints detected by the detecting means, and the position gains and the speed gains calculated by the first calculating means.

* * * * *